US012629660B2

(12) United States Patent
Lauber et al.

(10) Patent No.: US 12,629,660 B2
(45) Date of Patent: May 19, 2026

(54) METHOD OF ANALYSIS OF POLYNUCLEOTIDES BY RESTRICTED ACCESS REVERSED PHASE CHROMATOGRAPHY

(71) Applicant: Waters Technologies Corporation, Milford, MA (US)

(72) Inventors: Matthew A Lauber, North Smithfield, RI (US); Catalin Doneanu, Franklin, MA (US); Weibin Chen, Holliston, MA (US); Ying Qing Yu, Uxbridge, MA (US); Jennifer M. Nguyen, Uxbridge, MA (US); Fabrice Gritti, Franklin, MA (US); Martin Gilar, Franklin, MA (US)

(73) Assignee: Waters Technologies Corporation, Milford, MA (US)

( * ) Notice: Subject to any disclaimer, the term of this patent is extended or adjusted under 35 U.S.C. 154(b) by 384 days.

(21) Appl. No.: 18/144,514

(22) Filed: May 8, 2023

(65) Prior Publication Data
US 2023/0364585 A1    Nov. 16, 2023

Related U.S. Application Data

(60) Provisional application No. 63/340,173, filed on May 10, 2022.

(51) Int. Cl.
*B01J 20/288*    (2006.01)
*B01J 20/10*    (2006.01)
(Continued)

(52) U.S. Cl.
CPC ........... *B01J 20/288* (2013.01); *B01J 20/103* (2013.01); *B01J 20/28004* (2013.01); *B01J 20/3204* (2013.01); *B01J 2220/54* (2013.01)

(58) Field of Classification Search
USPC ........................................................ 210/656
See application file for complete search history.

(56) References Cited

U.S. PATENT DOCUMENTS

| | | | | |
|---|---|---|---|---|
| 5,585,236 A | * | 12/1996 | Bonn | C12Q 1/6806 |
| | | | | 435/6.12 |
| 2002/0164589 A1 | * | 11/2002 | Taylor | C12Q 1/6827 |
| | | | | 536/25.4 |

(Continued)

FOREIGN PATENT DOCUMENTS

WO    2021155139 A1    8/2021

OTHER PUBLICATIONS

Sahin, et al., mRNA-based therapeutics—developing a new class of drugs, Nature Reviews Drug Discovery, Oct. 1, 2014, vol. 13 Iss 10, https://doi.org/10.1038/nrd4278 (Year: 2014).*

(Continued)

*Primary Examiner* — Bobby Ramdhanie
(74) *Attorney, Agent, or Firm* — WOMBLE BOND DICKINSON (US) LLP; Deborah M. Vernon

(57) ABSTRACT

The present disclosure discusses a method of separating and/or purifying polynucleotides. The method includes injecting a sample into a chromatographic column that is packed with a porous sorbent having a pore size that substantially excludes the polynucleotides from the sorbent. This restricted access to the sorbent allows separation of large polynucleotides from each other and from smaller molecular weight impurities.

30 Claims, 11 Drawing Sheets

(51) Int. Cl.
  *B01J 20/28* (2006.01)
  *B01J 20/32* (2006.01)

(56) References Cited

U.S. PATENT DOCUMENTS

| | | | | |
|---|---|---|---|---|
| 2005/0106568 | A1* | 5/2005 | Kobayashi | A61P 43/00 |
| | | | | 435/6.12 |
| 2006/0241038 | A1* | 10/2006 | Watanabe | A61P 43/00 |
| | | | | 514/17.8 |
| 2009/0043042 | A1* | 2/2009 | Lippa | B01D 15/325 |
| | | | | 524/588 |
| 2011/0118452 | A1* | 5/2011 | Gjerde | G01N 1/34 |
| | | | | 530/413 |
| 2018/0334685 | A1* | 11/2018 | Yeo | C12N 15/85 |
| 2019/0283000 | A1* | 9/2019 | Pohl | B01J 20/3272 |

OTHER PUBLICATIONS

"Supelco® BIOshell™ IgG 1000 Å C4 Fused-Core® HPLC Columns" product data sheet, avantar ScienceCentral, https://www.avantorsciences.com/fi/en/catalog-number/63329-U (downloaded Jun. 23, 2025) (Year: 2025).*

Product Data Sheet, BIOshell A400 Protein C4 Nano/Capillary Columns Supelco , Bellefonte PA, (2014) Sigma-Aldrich Co. https://www.sigmaaldrich.com/deepweb/assets/sigmaaldrich/marketing/global/documents/275/675/bioshell-a400-c4-nano-capillary.pdf (Year: 2014).*

Millipore-Sigma, BIOshellTM IgG 1000 Å C4 U/HPLC product data sheet, https://www.sigmaaldrich.com/US/en/technical-documents/technical-article/analytical-chemistry/large-molecule-hplc/hplc-columns-for-antibody-and-large-protein-analysis (2025) (Year: 2025).*

Press Release, CRISPR Therapeutics and Vertex Announce FDA Fast Track Designation for CTX001 for the Treatment of Beta Thalassemia, Apr. 16, 2019 (Year: 2019).*

Close et al. "Nucleic acid separations using superficially porous silica particles." J. Chromatogr. A. 1440(2016): 135-144.

Periat et al. "Screening of the most relevant parameters for method development in ultra-high performance hydrophilic interaction chromatography." J. Chromatogr. A. (2013): 72-83.

Sands et al. "Characterization of bonded-phase silica gels with different pore diameters." J. Chromatogr. A. 360(1986): 353-369.

Wagner et al. "Superficially porous particles with 100 Å pores for large biomolecule liquid chromatography and polymer size exclusion chromatography." J. Chromatogr. A. 1489(2017): 75-85.

Donegan et al. "Effect of ion-pairing reagent hydrophobicity on liquid chromatography and mass spectrometry analysis of oligonucleotides." J. Chromatogr. A. 1666(2022): 462860.

Gilar. "Analysis and Purification of Synthetic Oligonucleotides by Reversed-Phase High-Performance Liquid Chromatography with Photodiode Array and Mass Spectrometry Detection." Anal. Biochem. 298.2(2001): 196-206.

International Search Report and Written Opinion issued in International Application No. PCT/IB2023/054769 dated Aug. 16, 2023.

Sinha et al. "Analysis and Purification of Synthetic Nucleic Acids Using HPLC." Curr. Prot. Nucl. Acid Chem. 61.1 (2015): 10.5.1-10.5.39.

Bagge et al. "Impact of stationary-phase pore size on chromatographic performance using oligonucleotide separation as a model." J. Chromatogr. A. 1634(2020): 461653.

Gritti. "Theoretical performance of multiple size-exclusion chromatography columns connected in series." J. Chromatogr. A. 1634(2020): 461673.

Jiang et al. "Oligonucleotide Sequence Mapping of Large Therapeutic mRNAs via Parallel Ribonucleasw Digestions and LC-MS/MS." Anal. Chem. 91(2019): 8500-8506.

Li et a. "Discovery of a novel deaminated metabolite of a single-stranded oligonucleotide in vivo by mass spectrometry." Bioanal. 11.21(2019): 1955-1966.

Liu et al. "Oligonucleotide quantification and metabolite profiling by high-resolution and accurate mass spectrometry." Bioanal. 11.21(2019): 1967-1981.

* cited by examiner

100

METHOD OF ANALYSIS OF POLYNUCLEOTIDES BY RESTRICTED ACCESS REVERSED PHASE CHROMATOGRAPHY

CROSS-REFERENCE TO RELATED APPLICATIONS

This application claims priority to and the benefit of U.S. Provisional Application Ser. No. 63/340,173, filed May 10, 2022, and entitled "Method of Analysis of Polynucleotides by Restricted Access Reversed Phase Chromatography." The foregoing application is incorporated herein by reference in its entirety.

FIELD OF THE TECHNOLOGY

The present disclosure relates to the use of restricted access reversed phase chromatography for the analysis of polynucleotides.

BACKGROUND

Polynucleotides are polymeric sequences of nucleotides (RNA, DNA, and their analogs) that are utilized extensively as PCR (polymerase chain reaction) and microarray-based reagents in life science research and DNA-based diagnostic test kits (as primer and probe reagents). With increased frequency, they are being developed as therapeutic drugs for a wide range of disease conditions. Only a few FDA-approved polynucleotide-based therapeutic drugs are on the market today, but there are over 100 currently in the clinical pipeline and many more in earlier stages of development.

Polynucleotides developed as therapeutics can take a variety of forms, from antisense oligonucleotides (ASOs), small interfering RNAs (siRNA), small hairpin RNAs (shRNAs), single guide RNA (sgRNA) and micro RNAs (miRNAs) that can effect "gene silencing," which is down-regulating or turning off the expression of specific genes/proteins; to Aptamers that behave like small molecule drugs and bind to specific disease targets; to messenger RNAs (mRNAs) that can be very long, and are being designed to up-regulate expression of a particular protein. To enhance their stability and/or cellular uptake in-vivo, polynucleotide therapeutics often incorporate chemically-modified nucleotides, are PEGylated, or are otherwise conjugated to other chemical moieties. And like other biologics, the biophysical characteristics and purity of these molecules must be precisely understood and controlled to meet regulatory requirements.

Polynucleotides are typically produced through an automated solid-phase synthesis process or in vivo transcription from a DNA-plasmid. Oligonucleotides, having length ranging from 20 up to 200 nucleotides are typically prepared using solid-phase sequencing, while larger polynucleotides (e.g., mRNA) are typically prepared by transcription from DNA. For example, common methods of preparing large polynucleotides includes de novo gene synthesis, reverse transcription and/or PCR amplification. Depending on the application, synthesis can be used to prepare nanograms to kilograms of polynucleotides. While these synthesis processes are efficient, they invariably result in truncated sequences, unreacted reagents, and other process-related by-products/impurities that need to be separated and removed in order to meet purity requirements.

Polynucleotides used in therapeutic formulations are mixed with a variety of excipients. Such excipients can affect the performance and shelf life of the therapeutic polynucleotides. When performing an analysis of polynucleotide formulations, it can be necessary to assess the amount of active polynucleotide in the formulation. Such analysis, however, can be complicated by the presence of excipients, particularly biomolecule based excipients such as cyclodextrins, lipids, and saccharides.

High-performance liquid chromatography (HPLC) has become a standard technique for purifying and analyzing polynucleotides. Reversed phase liquid chromatography, and in particular, ion paired reversed phase liquid chromatography are particularly useful for the separation and analysis of polynucleotides. While a number of factors can contribute to the success of a chromatographic separation of polynucleotides, one of the main factors in the quality of the separation of polynucleotides are the sorbent properties. Sorbent properties that affect the separation include surface chemistry of the sorbent, particle size, pore size and column dimensions.

With respect to pore size of the sorbent, it is generally thought that resolution of polynucleotides is improved with increasing pore size. For example, Sands et al. "Characterization of bonded-phase silica gels with different pore diameters" J. Chromatogr. A. 360 (1986) 353-369, found that the resolution of protein separation increased as the pore diameter and pore volume of the silica gel increased, the increase in resolution being the greatest for the higher molecular weight proteins. Wagner et al. "Superficially porous particles with 1000 Å pores for large biomolecule high performance liquid chromatography and polymer size exclusion chromatography" J. Chromatogr A. 2017 Mar. 17; 1489: 75-85, teaches that larger molecules of biological interest need large pore sizes or else the mass transport rate into and out of the pore will be exceedingly slow and lead to excessive zone broadening. Wagner et al. further teaches that matching the pore size to molecule size is extremely important, especially for cases where molecules of similar size, shape, and structure are to be separated. Close et al. "Nucleic acid separations using superficially porous silica particles" J. Chromatogr. A. 1440 (2016) 135-144, analyzed oligonucleotides having 19-24 base pairs with solid-core particles with pore sizes of 80 Å or 150 Å. Close et al. found that sorbents having a pore size of 80 Å show restricted diffusion for the oligonucleotides, resulting in broader peaks in comparison to the 150 Å pore size solid-core particles. Close et al. notes that these results are consistent with those observed for the analysis of peptides, where increased resolution is observed on the larger pore sized particles.

The use of large pore sorbents, however, is not ideal for the separation of polynucleotides from process-related by-products/impurities or excipients. When large pore sorbents are used, both the polynucleotides and the impurities/excipients are captured by the pores creating problems with isolation and analysis of the polynucleotides. It is desirable, therefore, to effect the separation of polynucleotides from these process-related by-products/impurities in an efficient manner.

SUMMARY

Polynucleotides, and particularly mRNA, have emerged as promising therapeutics. For example, mRNA was the basis of the first emergency authorized vaccine for SARS-CoV-2, and it has already been successfully used to induce neutralizing antibodies and T-cell immunity in millions of patients around the world. Polynucleotides represent a breakthrough in biotechnology, and provide an adaptable platform for dealing with new antigen sequences without any reliance on cell culturing. mRNA is typically prepared by in vitro transcription from a DNA plasmid and a cell free enzymatic process. Important post-transcriptional processes must occur during this process, namely the addition of a 5' end cap and 3' poly A tail. The integrity of the mRNA must be analyzed and impurities related to its synthesis must be monitored.

Because mRNA are inherently large molecules, they have very slow diffusion coefficients and thereby present a significant challenge for analysts needing to develop new analytical separation techniques. Traditional chromatographic analysis has focused on oligonucleotides, which are relatively small in size, compared to mRNA and other polynucleotides. Because of their relatively small size, it has become common practice to chromatographically analyze oligonucleotides, such as small interfering RNA and antisense oligonucleotides, with a stationary phase that can facilitate efficient intraparticle diffusion. Intraparticle diffusion can be achieved in oligonucleotides by using a sorbent having pores between 100 and 300 Å in diameter. This concept has been applied to larger polynucleotides, such as mRNA and polynucleotides having more than 200 base pairs by simply using sorbents having larger pores (e.g., 1000 Å, See Wagner et al. J. Chromatogr A. 2017 Mar. 17; 1489: 75-85). The use of large pore sorbents, however, is not ideal for the separation of larger polynucleotides (e.g., polynucleotides having a length of 100 or more nucleotides) from process-related by-products/impurities or excipients. When large pore sorbents are used, both the large polynucleotides and the impurities/excipients in the sample are captured by the pores leading to difficult separations and analysis.

In a surprising discovery it has been found that rather than attempt to enlarge the pores of a stationary phase to a diameter commensurate with the size of the polynucleotide, selection of a sorbent having a pore size that substantially excludes the polynucleotides from the sorbent is effective in producing sharp peaks for large nucleic acids by restricting large nucleic acids to only adsorptive interactions only at the surface of a porous particle stationary phase. This type of restricted access to the sorbent limits the large polynucleotides to mainly surface interactions with the sorbent. Simultaneously, the pores of the particle provide sufficient surface for an effective separation to be achieved on smaller molecular weight species (<5 kDa) through intra particle diffusion.

In an embodiment, a method of separating or purifying polynucleotides includes: injecting a sample comprising one or more polynucleotides into a chromatographic system, wherein the chromatographic system comprises a chromatographic column comprising a porous sorbent, wherein the average pore diameter of the porous sorbent is selected such that the polynucleotides are substantially excluded from the sorbent pores; and flowing the sample through the chromatographic system under reversed phase chromatography conditions.

In an embodiment, the polynucleotide has a length of at least 100 nucleotides. The polynucleotide may be RNA. Examples of RNA polynucleotides include mRNA or sgRNA.

In an embodiment, the porous sorbent has an average pore size of less than 300 Å. The porous sorbent may have an average pore size of less than 130 Å. The porous sorbent may have an average pore size of between about 30 Å to about 100 Å. In an embodiment, the porous sorbent is a silica bonded with a $C_2$-$C_{18}$ hydrocarbon. In an embodiment, the one or more polynucleotides have a pore accessibility in the porous sorbent of less than about 10%. The porous sorbent may be composed of particles having an average particle diameter of between about 1 μm to about 100 μm.

In an embodiment, the sample includes a mixture of polynucleotides. In one embodiment, the sample includes a mixture of one or more synthetic polynucleotides and impurities associated with the synthesis of the one or more polynucleotides. The method further includes separating the one or more polynucleotides from the impurities. In another embodiment, the sample comprises a mixture of one or more polynucleotides and excipients associated with the formulation of the one or more polynucleotides in a pharmaceutical product. The method further comprises separating the one or more polynucleotides from the excipients.

In an embodiment, the chromatographic system includes a column heater. The method includes heating the chromatographic column to a temperature sufficient to denature double stranded polynucleotides in the sample.

In an embodiment, the reversed phase chromatography conditions include using a polar mobile phase comprising an ion pairing reagent.

In an embodiment, the method includes passing the one or more polynucleotides to a detector after the one or more polynucleotides pass through the chromatographic column. The detector may be a mass spectrometer, an optical detector, or both mass spectroscopy and optical detectors may be used.

BRIEF DESCRIPTION OF THE DRAWINGS

The technology will be more fully understood from the following detailed description taken in conjunction with the accompanying drawings, in which.

Figure 7A:
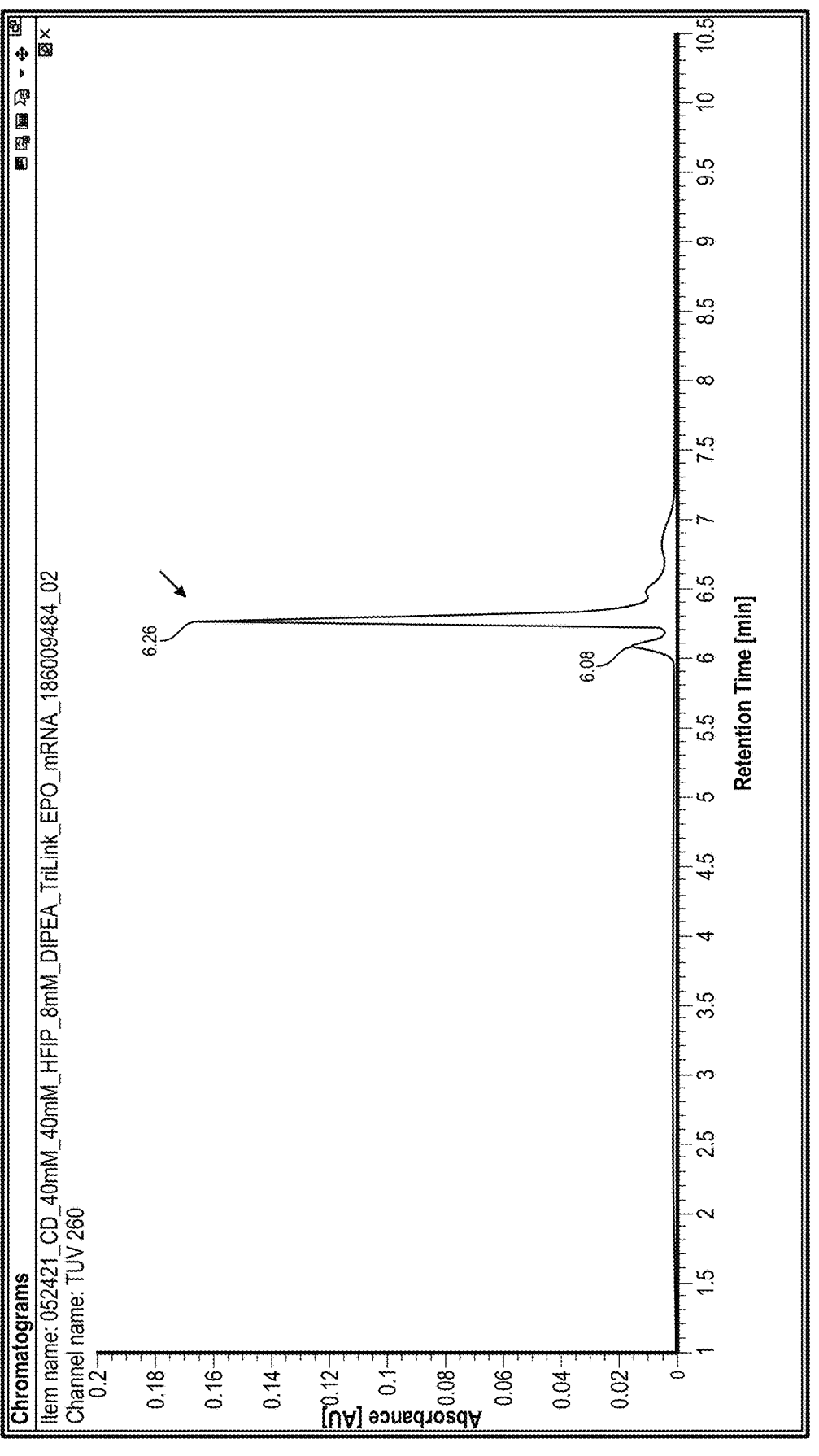
FIG. 7A displays a LC-UV chromatogram obtained for the analysis of TriLink EPO (human erythropoientin)
Figure 7B:
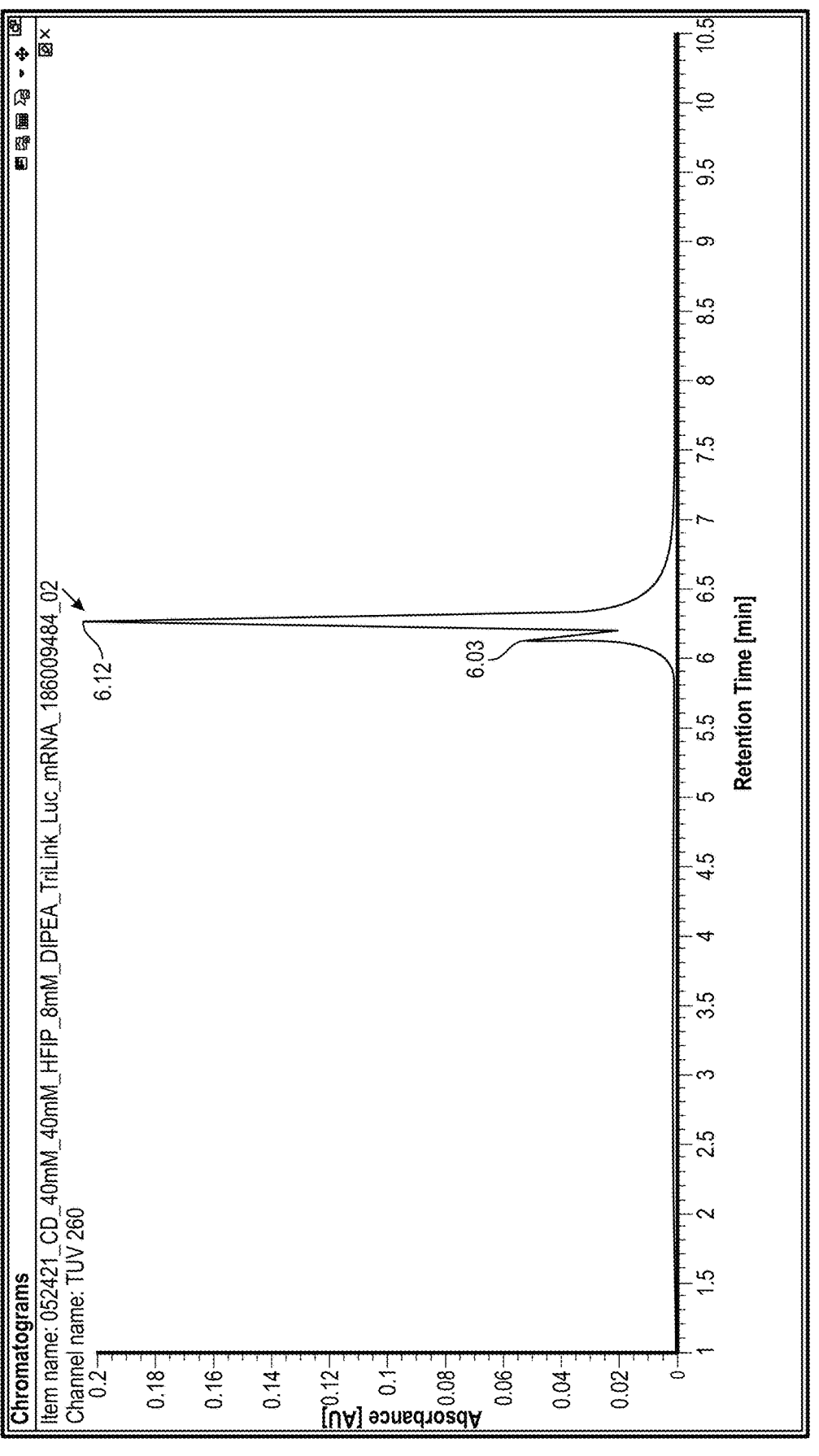
Figure 7C:
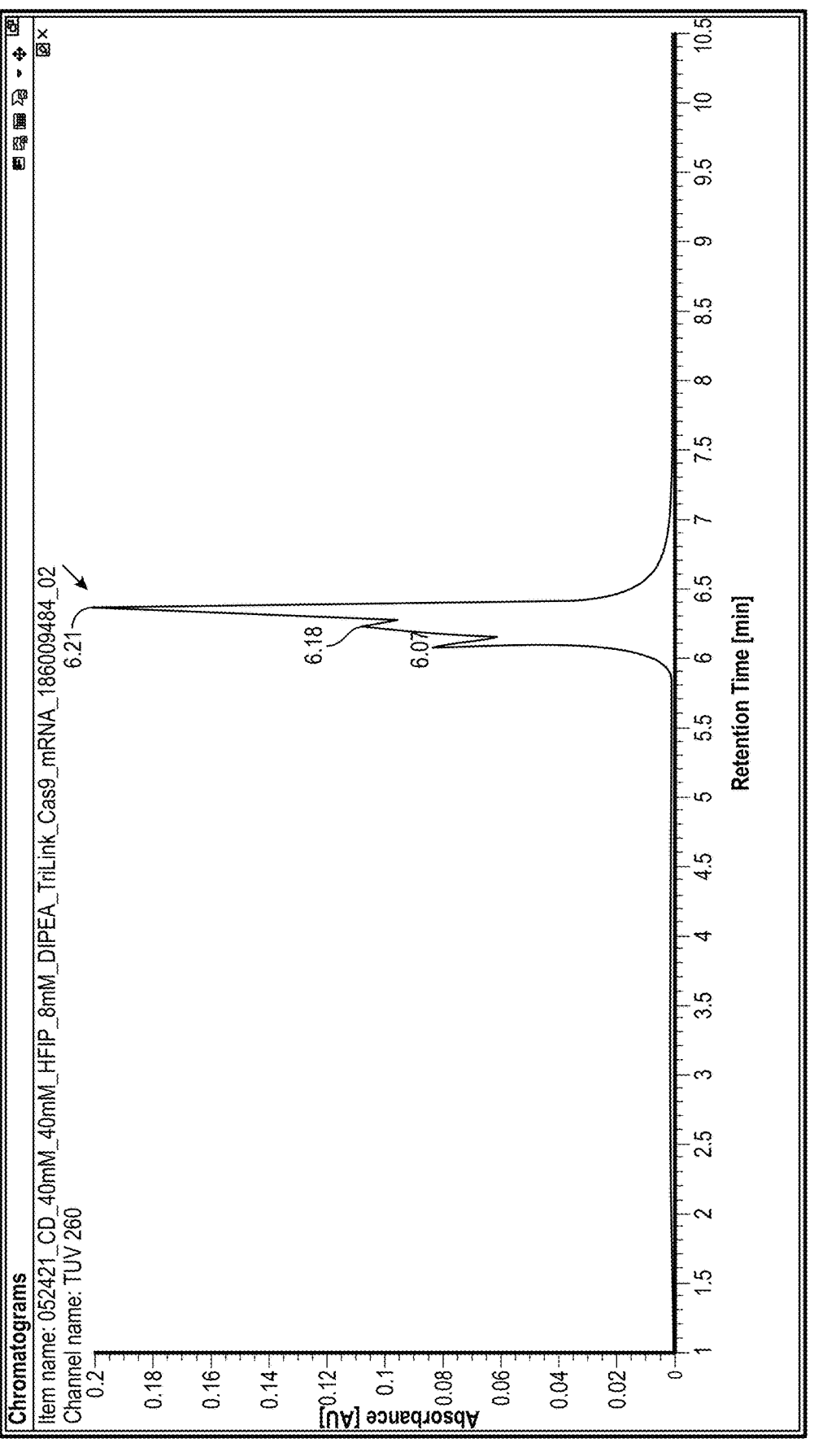

mRNA (858 nt) following ion-pairing reverse phase separation using a column with an average pore size of 130 Å;

FIG. 7B displays a LC-UV chromatogram obtained for the analysis of TriLink Luc (firefly luciferase) mRNA (1929 nt) following ion-pairing reverse phase separation using a column with an average pore size of 130 Å; and FIG. 7C displays a LC-UV chromatogram obtained for the analysis of TriLink Cas-9 (firefly luciferase) mRNA (4521 nt) following ion-pairing reverse phase separation using a column with an average pore size of 130.

DETAILED DESCRIPTION

In general, the present disclosure is related to the use of restricted access chromatography for the separation and purification of polynucleotides. In restricted access chromatography, a sorbent is selected having an average pore size that excludes at least a portion of the polynucleotide analytes from interacting and/or entering the pores, while allowing small molecule impurities to be trapped in the pores. This allows an efficient separation of the polynucleotides from small molecular weight compounds.

Figure 1:
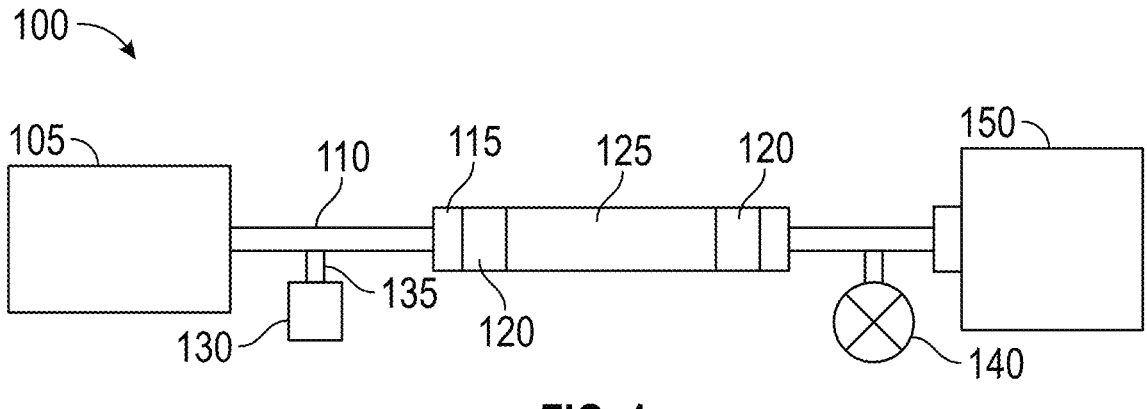
FIG. 1 is a schematic diagram of a typical chromatography system.

FIG. 1 is a representative schematic of a typical chromatography system 100 that can be used to separate and/or purify polynucleotides in a sample. Chromatographic flow system 100 includes several components including a fluid manager system 105 (e.g., controls mobile phase flow through the system), tubing 110 (which could also be replaced or used together with micro fabricated fluid conduits), fluid connectors 115 (e.g., fluidic caps), frits 120, a chromatography column 125, a sample injector 135 including a needle (not shown) to insert or inject the sample into the mobile phase, a vial, sinker, or sample reservoir 130 for holding the sample prior to injection, and a detector 150, such as a mass spectrometer.

In an embodiment, a method of separating and/or purifying polynucleotides includes injecting a sample having one or more polynucleotides into a chromatographic system. As used herein the term "polynucleotide" refers to polymeric sequences of nucleotides bonded in a chain. Polynucleotides include deoxyribonucleic acid (DNA) and ribonucleic acid (RNA) biomolecules. Polynucleotides can have very different lengths depending on the source and use of the polynucleotide. Oligonucleotides are polynucleotides that generally have a length of 10 to 200 nucleotides. Oligonucleotides includes antisense oligonucleotides (ASOs), single guide RNA (NA) small interfering RNAs (siRNA), small hairpin RNAs (shRNAs), transfer RNA (tRNA), and micro RNAs (miRNAs). Messenger RNA (mRNA) is a single stranded molecule of RNA that corresponds to the genetic sequence of a gene. mRNA is used during protein formation where it is "read" by a ribosome and used as template for synthesizing the protein. More recently, mRNA has become an important therapeutic agent for the treatment of viruses and genetic diseases. As used herein, the term "large polynucleotides" refers to polynucleotides having anywhere from 100 nucleotides up to 8000 or more nucleotides. Polynucleotides may be single stranded or double stranded. When double stranded polynucleotides are to be tested, the polynucleotide strands may be separated (i.e., denatured), chemically or by heating.

The sample that includes polynucleotides is injected into the chromatographic system and passed through the chromatographic column. The chromatographic column includes a porous sorbent. As used herein the term "sorbent" refers to the packing material used as the stationary phase of a chromatographic column. A sorbent can partially retain the sample material through either absorptive or adsorptive interactions. A "porous sorbent" is a sorbent that has interconnecting pores of a specific diameter. For example, a 90 Å sorbent is composed of porous sorbent particles having an average pore diameter of 90 Å.

The average pore size of the porous sorbent is selected such that the polynucleotides of interest in the sample are substantially excluded from the sorbent pores. As used herein, the phrase "excluded from the sorbent pores" refers to the condition where the molecules (in this case, polynucleotides) are too large to enter the pores of the sorbent. For example, mRNA molecules are generally excluded from entering sorbent pores having a diameter of 300 Å or less, due to their size.

The sample is flowed through the chromatographic system under reversed phase chromatography conditions. Reversed phase chromatography is a technique that uses a hydrophobic (non-polar) stationary phase and a polar (typically aqueous) mobile phase. The mobile phase, in some embodiments, is composed of an eluent in a solvent. The "eluent" is the carrier portion of the mobile phase. The eluent displaces the analyte from the sorbent allowing the analyte to travel through the stationary phase of the chromatography column. A "polar mobile phase" is, in some embodiments, composed of a polar solvent and a polar eluent. However, in other embodiments, a polar mobile phase may be composed of a polar eluent in a non-polar solvent, or a non-polar eluent in a polar solvent. A polar mobile phase has a dielectric constant of 15 or more. In reversed phase chromatography, hydrophilic molecules will generally move through the stationary phase faster than hydrophobic molecules, which is the reverse of normal-phase chromatography. Ion pair chromatography utilizes an ion pair reagent in the mobile phase. The ion pair reagent has a charge opposite to the analyte of interest. The ion pair reagent also will, typically, have a substantial hydrophobic region that allows interaction with the hydrophobic stationary phase. The use of ion pair reagents allows different retention of analytes to facilitate separation. Ion paired reversed phase chromatography combines these two concepts—a hydrophobic stationary phase is used with a polar mobile phase that includes an ion pair reagent.

Flowing the sample through the column under reversed phase chromatography conditions allows the polynucleotides to be separated, despite the substantial exclusion of the polynucleotides from the pores of the sorbent. While not intending to be limited to any particular theory, it is believed that large polynucleotides might exhibit an S-term value and corresponding isotherm behavior similar to very large proteins. In some forms of ion pairing reverse phase chromatography, we propose that large polynucleotides will primarily undergo a so-called 'bind and elute' separation. The chromatographic surface area within a porous particle may not be of benefit to the resolution and selectivity of the separation of large polynucleotides. Substantially total exclusion from a porous particle is thus advantageous for the separation and purification of large polynucleotides.

In one embodiment, the polynucleotides in the sample may be produced by solid-phase synthesis processes (for example, using a phosphoramidate process). This process is generally used for polynucleotides up to about 200 nucleotides. For larger nucleotides, in vitro transcription from a DNA plasmid may be used. Both of these synthetic methods can leave process-related by-products/impurities in the product after the synthesis is complete. Such byproducts/impurities include, but are not limited to, residual nucleotides, nucleic acid fragments, and reagents used during the synthesis of the polynucleotides. For preparation of therapeutic agents, the integrity of the mRNA is analyzed and impurities related to its synthesis are monitored. Use of the described method may solve this issue. The large polynucleotides are substantially excluded from the pores, while impurities related to the synthesis of the mRNA are trapped in the pores and elute much later than the polynucleotides. The separation and analysis of polynucleotides can then be accomplished without the interference of these impurities.

In other embodiments, samples containing large polynucleotides may be obtained during biomedical research. In such embodiments, a sample may include polynucleotides in a complex matrix. For example, a sample may include mRNA transcripts or mitochondrial and cytosolic ribosomal RNA collected from a tissue or blood sample. In addition to mRNA, other larger nucleic acid molecules exist that would benefit from the process described herein, including but not limited to single guide RNA (sgRNA) of the CRISPR system and DNA plasmids or their fragments.

Polynucleotides used in therapeutic formulations are mixed with a variety of excipients. Such excipients can affect the performance and shelf life of the therapeutic polynucleotides. When performing an analysis of polynucleotide formulations, it can be necessary to assess the amount of active polynucleotide in the formulation. Such analysis, however, can be complicated by the presence of excipients, particularly biomolecule based excipients such as lipids, polyethylene glycols (PEGs) and saccharides. Examples of lipids used as excipients in polynucleotide formulations include glycerides (e.g., monoglycerides, diglycerides, and triglycerides) and phospholipids. Use of the described method may solve this issue. The large polynucleotides are substantially excluded from the pores, while the excipients are trapped in the pores and elute much later than the polynucleotides. The separation and analysis of polynucleotides can then be accomplished without the interference of excipients. Without wishing to be bound by theory, the technology of the present application can provide advantages when analyzing mRNA vaccines. For example, the excipients within the vaccine formulation (e.g., lipids) can be passed into the accessible porosity, whereas the larger mRNA molecules will be prevented from entering the pores due to their size. As a result, the mRNA will separate due to interactions on the surface of the porous stationary phase and the smaller lipids will pass through the pores (small pores selected using the technology of the present application) for separation and elution thereof. Because the lipids can access intraparticle surfaces, it is believed that advantages will exist in loading capacity and their peak shape as a function of mass load onto the column.

For the separation and/or purification of large polynucleotides, the porous sorbent will generally have an average pore size of less than or equal to 300 Å, less than or equal to 250 Å, less than or equal to 200 Å, less than or equal to 150 Å, less than or equal to 140 Å, less than or equal to 130 Å, less than or equal to 120 Å, less than or equal to 110 Å, less than or equal to 100 Å, less than or equal to 90 Å, less than or equal to 80 Å, less than or equal to 70 Å, less than or equal to 60 Å, or less than or equal to 50 Å. In some embodiments, the porous sorbent has an average pore size of between about 10 Å to about 300 Å, between about 30 Å and about 250 Å, between about 50 Å and about 200 Å, between about 75 Å and about 150 Å; or between about 90 Å and about 130 Å. Preferred porous sorbents have an average pore size of about 10 Å, 20 Å, 30 Å, 45 Å, 60 Å, 75 Å, 90 Å, 95 Å, 100 Å, 110 Å, 120 Å, or 130 Å.

The pore size of the porous sorbent is, in one embodiment, selected such that one or more polynucleotides have a pore accessibility in the porous sorbent of less than 10%. Pore accessibility is determined as a percentage of the amount of material, in this case polynucleotide material, that enters/interacts with the pores of the porous sorbent, compared to the amount of material that only interacts with the exterior of the porous sorbent. This can be calculated from the formula:

$$\text{Pore accessibility } (\%)=100^*(V_{p\ visited}/V_p) \qquad (1)$$

Where $V_p$ is the total volume of the pores of the porous sorbent and $V_{p\ visited}$ is the total volume of the pores that the polynucleotide enters/interacts with.

The volume of empty column $V_c$ is calculated as volume of cylinder from the column internal diameter de and length L:

$$V_c=\pi\times(d_c/2)^2\times L \qquad (2)$$

The portion of the column that is filled with solid particles is volume $V_s$, and the remaining volume is liquid $V_0$. Some of liquid volume resides between particles—so called external interstitial volume $V_e$ and the remaining volume of liquid resides within the pores of particles, $V_p$. This leads to the following equations:

$$V_0=V_e+V_p \qquad (3)$$

$$V_c=V_s+V_0=V_s+V_e+V_p \qquad (4)$$

The normalized volumetric fractions within the column are:

$$\varepsilon_s+\varepsilon_e+\varepsilon_p=1=\varepsilon_c \qquad (5)$$

In chromatographic experiments, chromatograms are generated showing retention (elution) times $t_r$. Retention time values can be converted to volumes by multiplying with the flow rate F.

$$V_r=t_r\times F \qquad (6)$$

$$V_0=t_0\times F \qquad (7)$$

Where $t_r$ is the retention time of the analyte (e.g., a polynucleotide). The values of to or $V_0$ are obtained when the molecule is 100% included in the pores; the compound (small molecule) can visit all liquid volume within the column $V_0=V_e+V_p$. If the molecule size is significantly larger than the available pores it is 100% excluded (0% pore accessibility). A compound having 0% pore accessibility visits only external particle volume $V_e$ and not sorbent pores volume $V_p$ and elutes in $V_e$. We can calculate external interstitial volume $V_e$ from $V_e=V_0-V_p$. Polynucleotides that are substantially excluded for the sorbent pores are eluted within the two extreme limits, $V_e$ and $V_0$. The difference $V_0-V_e$ represents the pore volume $V_p$. In normalized terms, equation (1) translates to:

$$\text{Pore accessibility } (\%)=100^*[Ft_r-\varepsilon_e\pi(d_c/2)^2 L)]/[\varepsilon_p\pi (d_c/2)^2 L](8)$$

The stationary phase is generally selected or created from a silica, organosilica (hybrid inorganic-organic), or polymeric composition. The morphology of the particle can be fully porous or superficially porous. The porous sorbent can be unbonded, grafted or silanized with a hydrophobic surface area to achieve a desired level of reversed phase retention. In an embodiment, the porous sorbent is a silica sorbent bonded with a $C_1$-$C_{18}$ hydrocarbon. Silica porous sorbents can be bonded to alkyl constituents ranging from trimethyl silyl ($C_1$) to octyl decyl silyl ($C_{18}$). Phenyl and aromatic based bonded silica porous sorbents may also be used.

In some embodiments, it is beneficial to make use of a pH stable sorbents. In some embodiments, the porous sorbent will be composed of particles having an average diameter between 1 and 100 μm. In preferred embodiments, the porous sorbent is composed of particles having an average diameter of between about 1.3 and 10 μm in diameter.

For reversed phase chromatography a polar mobile phase is used. In the present method, different polar mobile phase systems can be used to effect separation of the polynucleotides. For reversed-phase separations of polynucleotides, ion-pairing liquid chromatography (IPLC) is employed in order to achieve retention of molecules that are acidic and comprised of negatively charged backbones. Amines are typically employed as the ion pairing agent in these separations, where the cationic nature of the amine will form ion-pairs with the negatively charged phosphate groups of the polynucleotide. In an embodiment, amines used as an ion pairing agent contain hydrophobic alkyl groups which can interact with the hydrophobic stationary phase ligand, such as a C18 group, to aid in analyte retention. Ion pairing agents that can be used, include, but are not limited to, ammonia, triethylamine, hexylamine, diisopropylethylamine, and octylamine.

In addition to ion pairing agents, buffer additives are sometimes employed, including perfluorinated alcohols like hexafluoroisopropanol (HFIP). These types of mobile phase additives facilitate the titration of the mobile phase without the introduction of high levels of anionic counterions/acid. This is particularly useful when a mass spectrometry detector is used, since anionic counterions and acids can suppress negative ion mode electrospray ionization. In preferred embodiments, water:methanol, water:acetonitrile or water:methanol:acetonitrile reversed phase mobile phase is employed, with or without ion pairing agents.

In some instances, a sample of polynucleotides may include double stranded polynucleotides. Double stranded nucleotides may be created during in vitro transcription as a result of RNA-dependent polymerase activities. Double stranded polynucleotides may be separable from single stranded polynucleotides by using porous sorbents having an average pore diameter that substantially excludes both single stranded and double stranded variants of the polynucleotides. Since the porous sorbents achieve resolving power primarily through surface adsorption and partitioning, the lighter single stranded polynucleotides will travel through the column faster than the double stranded polynucleotides. This property of the restricted access chromatography allows double stranded contaminants to be easily removed, separated and quantified with respect to their single stranded counterparts.

In an alternative approach, a non-porous stationary phase may be employed to achieve the same effect of a sharp nucleic acid peak. However, a column packed with a non-porous phase generally will exhibit very poor retentivity for any small molecule sample components. Moreover, non-porous stationary phases have proven to be difficult to reproducibly pack in contrast to porous particles.

In another embodiment, the chromatography system parameters or the mobile phase may be used to convert double stranded polynucleotides to single stranded nucleotides (known as denaturation) before the sample is passed through the chromatographic column. Denaturation may be accomplished through column temperature and ion pairing conditions to facilitate the conversion of double stranded polynucleotides into their corresponding single stranded polynucleotides.

A variety of detection systems may be used to analyze the polynucleotides. Exemplary detection systems include, but are not limited to, detection systems that use optical detection (e.g., UV detection), fluorescence detection, evaporative light scattering, charged aerosol detection, pulsed amperometric detection, mass spectrometry, or any combination thereof. The detection system may be used to provide absolute quantitation of polynucleotides or may be applied to achieve relative quantitation of a mixture of polynucleotides.

Examples

To explore this hypothesis, a series of oligonucleotides differing in length were prepared and examined with stationary phase particles having different average pore diameter. A first portion of this study was performed with 1.7 μm BEH C18 sorbents having 300 Å versus 130 Å average pore diameters as well as a 1.6 μm superficially porous C18 (with a core-shell (CS) structure) having a 90 Å average pore diameter. Column dimensions were 50×2.1 mm. The samples were 20, 40 or 100 base pair polynucleotides which were completely unretained in the mobile phase. Mobile phase: 75% acetonitrile, 25% 100 mM hexylammonium acetate (in water), pH 8.1. In 75% acetonitrile conditions the polynucleotides are completely unretained and elute at void time or before to, if they are excluded from the pores. Flow rate was 0.1-1.5 mL/min, temp 60° C., polynucleotide retention time was recorded at various flow rates, but only minor dependence of the inclusion-exclusion was observed. $t_0$ of the columns was estimated using acetone in 100% methanol (unretained conditions).

Figure 2:
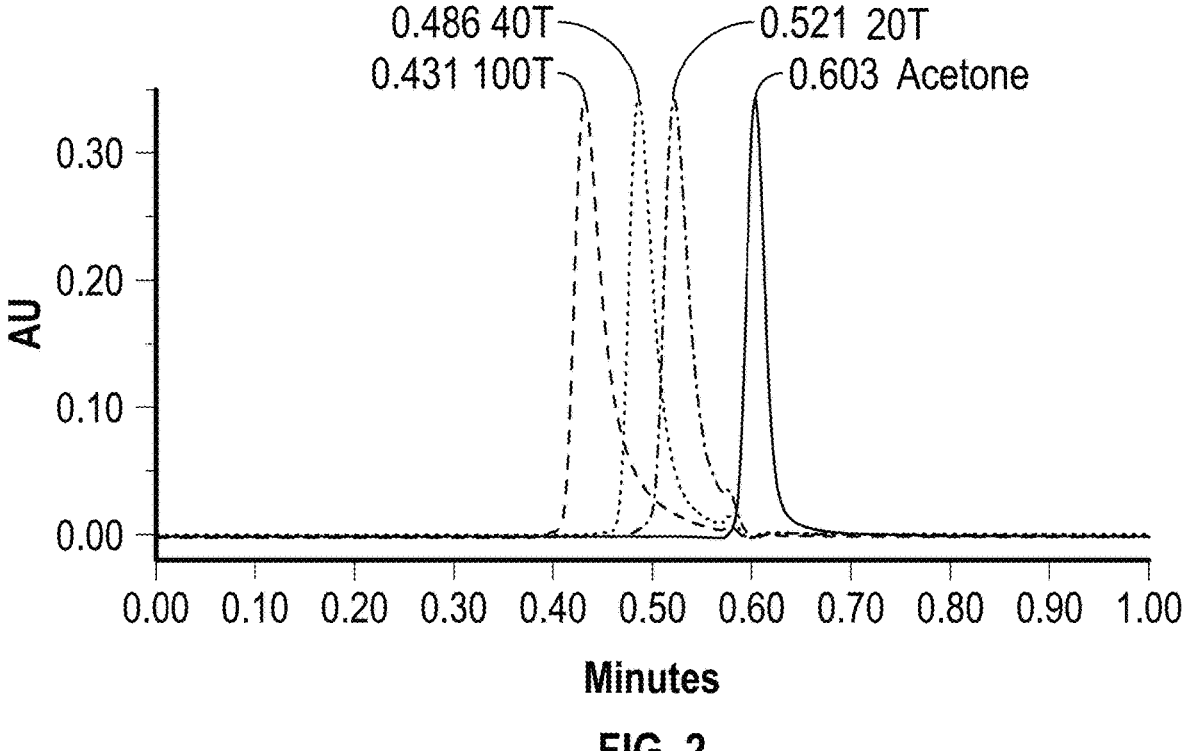
FIG. 2 is a representative chromatogram obtained from the test run using the BEH C18 300 Å column and samples containing 20, 40 or 100 base pair polynucleotides or acetone.

FIG. 2 depicts a representative chromatogram obtained from the test run using the BEH C18 300 Å column and samples containing 20, 40 or 100 base pair polynucleotides or acetone. The first eluting peak is the 100 base pairs polynucleotide. The second eluting peak is the 40 base pairs polynucleotide. The third eluting peak is the 20 base pairs polynucleotide. The last (fourth) peak is acetone, which is used as to marker. The measured retention (elution) times $t_r$ were converted to volumes by multiplying time by flow rate F. $V_r = t_r \times F$ or $V_0 = t_0 \times F$. Lower retention time values indicated partial or complete exclusion from the sorbent pores. As shown in FIG. 2, the larger polynucleotides were more excluded from the pores than the shorter ones and the void marker (acetone).

Figure 3:
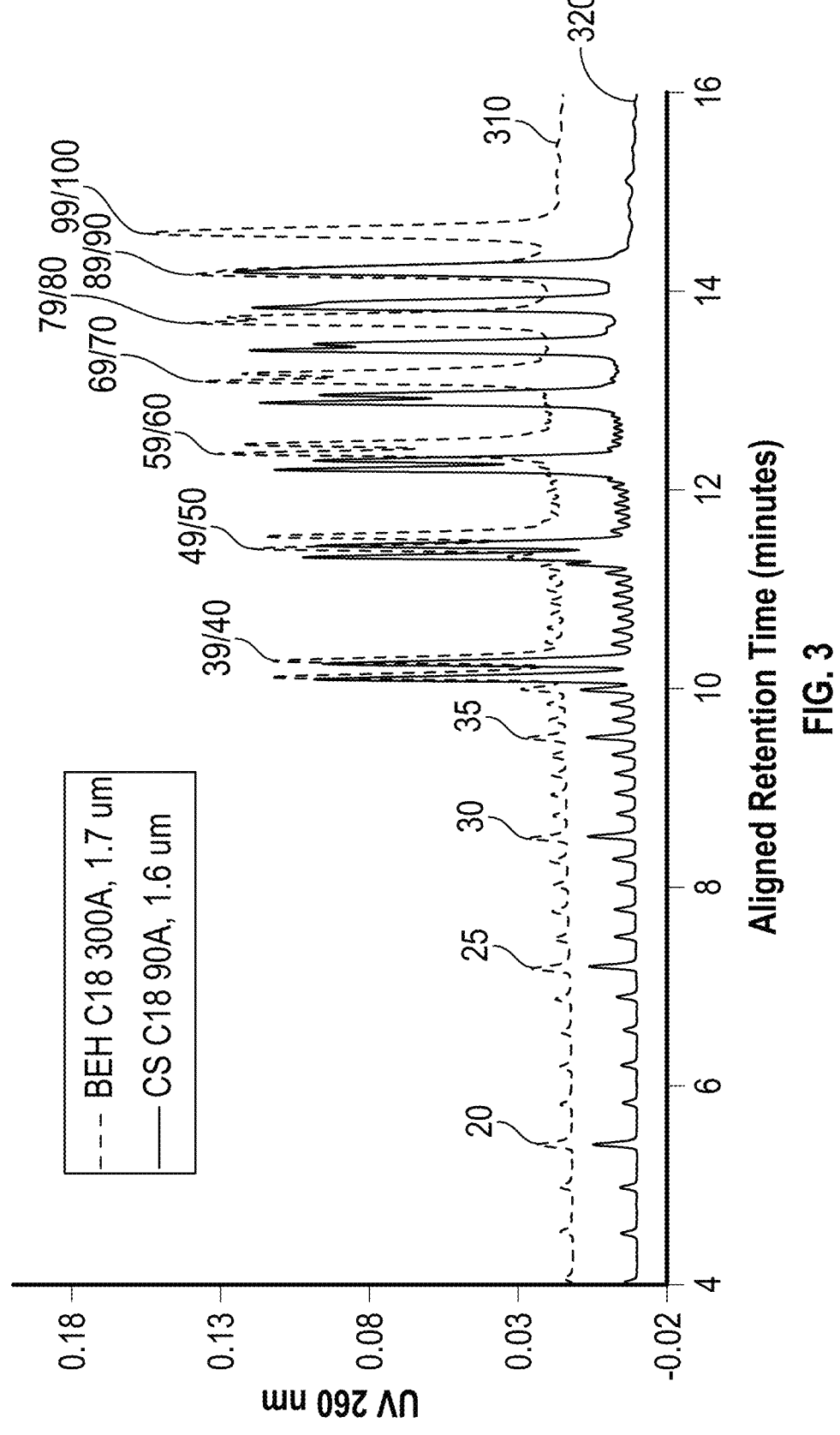
FIG. 3 is an overlay of gradient separation chromatograms resulting from using 90 Å pore diameter particles in a column versus 300 Å pore diameter particles in a column.

FIG. 3 shows an overlay of gradient separation chromatograms resulting from the use of the 90 Å (chromatogram 320) versus 300 Å (chromatogram 310) pore diameter particles. The chromatograms for 90 Å and 300 Å columns were aligned using retention of 20-30 base pair peaks. Enhanced retention for 300 Å column is presumably due to inclusion in the pores (higher available sorbent surface). Overall retention is only slightly reduced for 90 Å column while peaks are narrower, which results in comparable resolution of the critical pairs n−1/n (e.g., 39/40, 49/50, 59/60, etc.). Despite imparting nearly complete exclusion of the polynucleotides from the pores, the 90 Å pore size particle yields resolving power that is near equivalent to that afforded by 300 Å pore diameter particles that allow for some intraparticle diffusion.

A second portion of this study was performed with 1.7 or 2.5 μm BEH C18 sorbents having 63 Å, 95 Å, 130 Å, 300 Å, 450 Å, or 900 Å average pore diameters. That is, a step ladder approach to pore size was evaluated in this second portion of the study. Column dimensions were 50×2.1 mm. The samples were 20, 40 or 100 base pair polynucleotides which were completely unretained in the mobile phase. Mobile phase: 75% acetonitrile, 25% 100 mM hexylammonium acetate (in water), pH~8.5. In 75% acetonitrile conditions the polynucleotides are completely unretained and elute at void time or before to, if they are excluded from the pores. Flow rate was 0.2 mL/min, column temp 30° C., polynucleotide retention time was detected using a PDA stainless steel cell, 1500 nL, 260 nm detection. 0.1 to 0.5 μL injections were accomplished using a 15 μL needle.

Figure 4A:
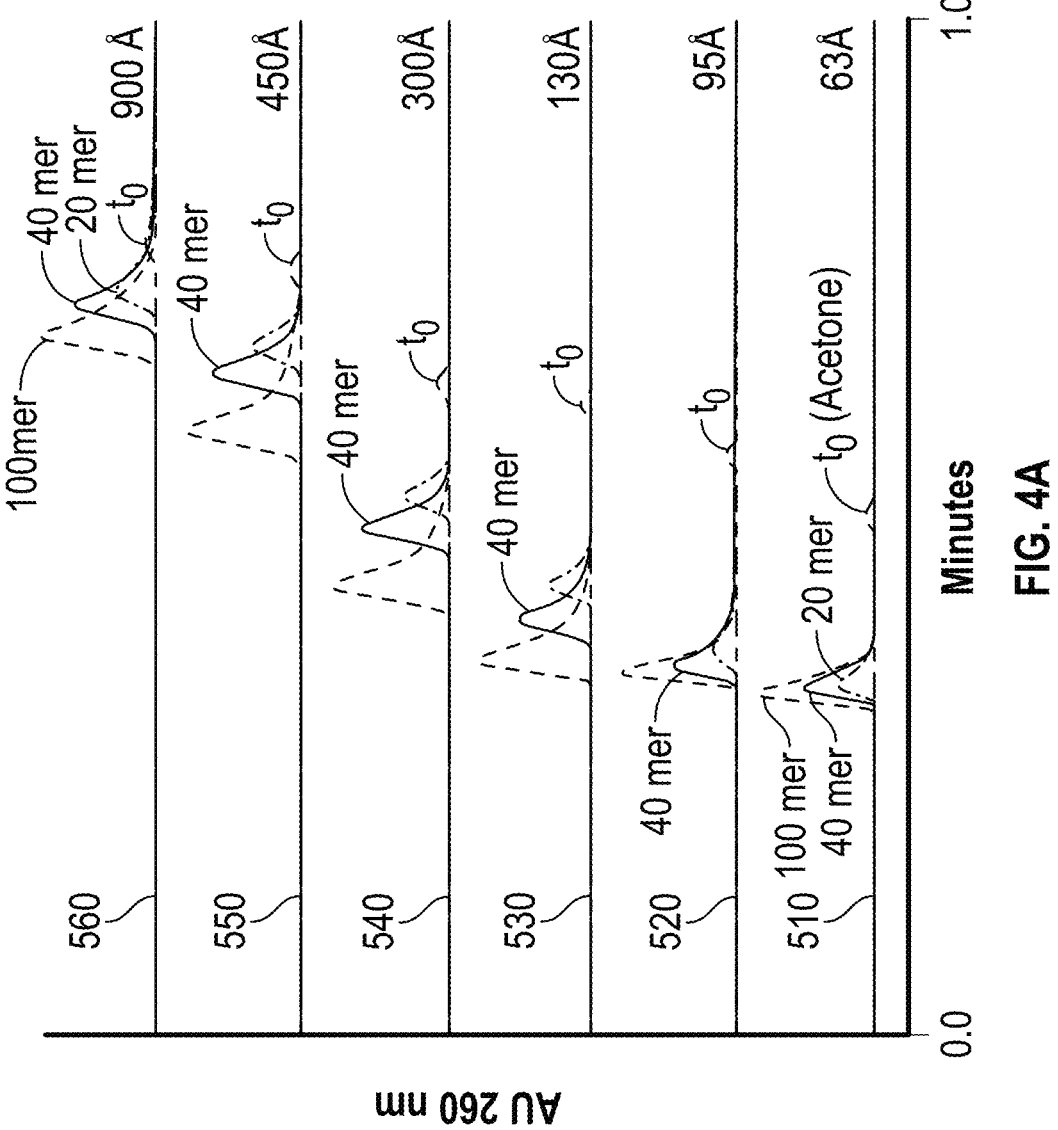
FIG. 4A displays comparative chromatograms of an oligonucleotide sample and acetone injections on columns having various pore size (63 Å to 900 Å) under unretained conditions.

FIG. 4A depicts comparative chromatograms of the 20 mer, 40 mer and 100 mer (and acetone) elutions on 6 columns having different pore sizes. Specifically, chromatogram 510 illustrates the elution results for a column having an average pore size of 63 Å. Chromatogram 520 shows the results for a column having an average pore size of 95 Å; chromatogram 530 shows the results for a column having an average pore size of 130 Å; chromatogram 540 shows the results for a column having an average pore size of 300 Å; chromatogram 550 shows the results for a column having an average pore size of 450 Å; and chromatogram 560 shows the results for a column having an average pore size of 900 Å. These elution results illustrate a ladder or a stepped increase in pore size. For the 63 Å pore size, chromatogram 510 illustrates that the 20 mer, 40 mer, and 100 mer oligonucleotides elute approximately at the same time. This indicates that the oligonucleotides are fully excluded from the pores (e.g., peaks are narrow due to no diffusion within the pores).

Chromatogram 520 (95 Å results) shows the beginning of some inclusion of the 20 mer oligonucleotides (e.g., see the shift in the 20 mer peak as compared to the alignment of the 40 mer and the 100 mer). Chromatograms 530, 540, 550, and 560 show the different degree of inclusion of the oligonucleotides in the pores for the columns having 130 Å to 900 Å average pore sizes. The oligonucleotides are "walking" closer to 100% pre included small molecule marker (i.e., to (acetone)). Completely pore included oligonucleotides would elute at the same time as a small molecule in to. The 900 Å average pore size column (i.e., chromatogram 560) is approaching that scenario—oligonucleotides can access most of the pore volume.

Figure 4B:
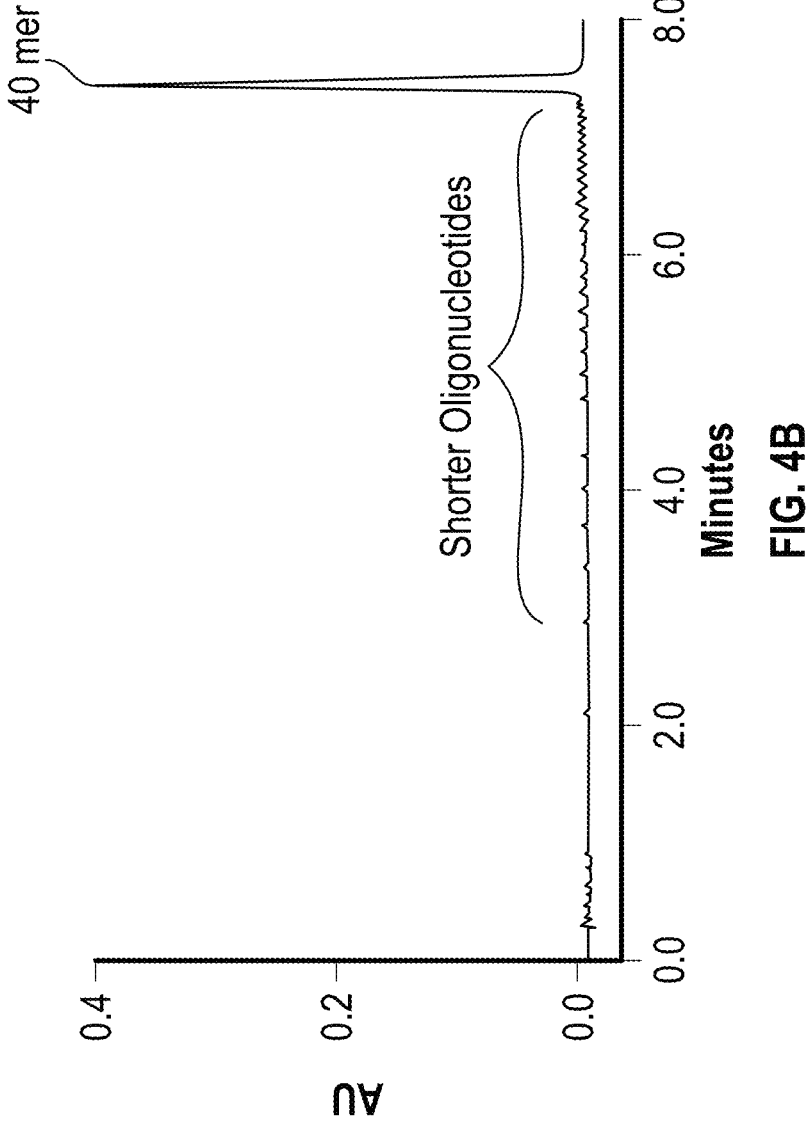
FIG. 4B is a chromatogram of an ion-pairing reverse phase liquid chromatography analysis of a 40 mer oligonucleotide sample. The 40 mer oligonucleotide sample was used in the analysis shown in FIG. 4A, FIG. 4C, FIG. 3 and FIG. 2.

To address any possible confusion in the above results regarding peak tailing in chromatograms 510-560, a quality check of the 40 mer oligonucleotide sample was completed. The results of this quality check are shown in FIG. 4B. To generate the chromatogram shown in FIG. 4B, an ion pairing reverse phase liquid chromatogram separation of the 40 mer sample was analyzed. While the commercially available 40 mer oligonucleotide sample is mostly a 40 mer sample, it also contains some "shortmers" originating from synthesis. Therefore, it is believed, that some of the peak tailing shown in FIG. 4A is due to real separation of shortmers from the 40 mer sample. It is not a tailing due to non-specific interactions with the sorbent.

Figure 4C:
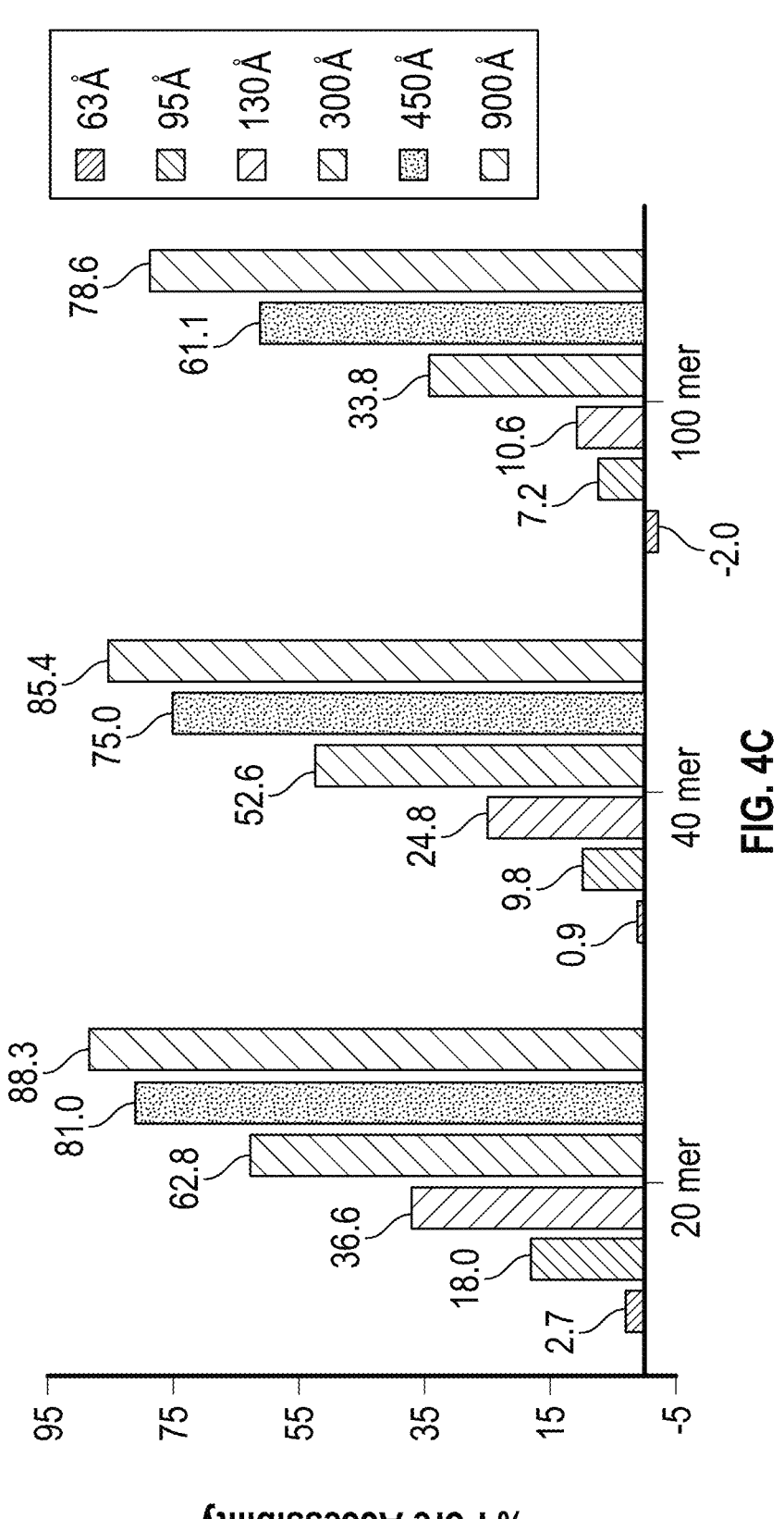
FIG. 4C is a bar graph of the obtained pore accessibility results for 63 Å, 95 Å, 130 Å, 300 Å, 450 Å, and 900 Å columns.

Referring to FIG. 4C, pore accessibility data is shown in bar graph form for the 6 different average pore size columns (i.e., 63 Å, 95 Å, 130 Å, 300 Å, and 450 Å) for each of the 20 mer, 40 mer, and 100 mer oligonucleotides. This data was generated from the elution results shown in FIG. 4A. As indicated by the bar graph results, the 63 Å average pore size column behaves as a "non-porous" average pore size column for oligonucleotides (i.e., 20 mer, 40 mer, and 100 mer) and the 95 Å and 130 Å average pore size columns are essentially "non-porous" for oligonucleotides of 100 mer or greater.

Intact mRNA Separation with a 100 Å Pore Diameter Stationary Phase

An intact erythropoietin (EPO)-encoding mRNA (Tri-Link, L-7209) was separated by ion pairing reversed phase chromatography using a 1.8 μm 100 Å silica particle bonded with trifunctional C18. The mRNA was prepared with a proprietary co-transcriptional capping method and has a polyadenylated 3' tail as well as 5-methoxyuridine residues to be optimized for transcription by mammalian systems. It serves as a representative sample of large polynucleotides, varying in size and modifications.

LC Conditions

Column: ACQUITY UPLC HSS T3 1.8 μm, 100 Å, 1.0×100 mm

Mobile Phase A: 60 mM (or 1%) HFIP (hexafluoroisopropanol), 8 mM (or 0.1%) DIPEA (N,N-diisopropylethylamine) in 18.2 M9 water Mobile Phase B: 4.5 mM (0.075%) HFIP, 3 mM (0.0375%) DIPEA in 75% acetonitrile Flow Rate: 0.1 mL/min Column Temperature: 60° C.

Injection Volume: 1, 2, and 5 μL

Sample Preparation: 100 μg of EPO mRNA were dissolved into 100 μL of DI water to prepare a stock solution with a concentration of 1 μg/mL. The stock solution was further diluted 1:1 with DI water just before analysis.

Detection: UV at 260 nm

MS Detection: Synapt XS

| Gradient Table | | | |
| --- | --- | --- | --- |
| Time (min) | Flow Rate (mL/min) | % A | % B |
| Initial | 0.100 | 90 | 10 |
| 1.00 | 0.100 | 90 | 10 |
| 5.00 | 0.100 | 50 | 50 |
| 6.00 | 0.100 | 50 | 50 |
| 6.10 | 0.100 | 85 | 85 |
| 6.90 | 0.100 | 85 | 85 |
| 7.00 | 0.100 | 10 | 10 |
| 15.00 | 0.100 | 10 | 10 |

Figure 5A:
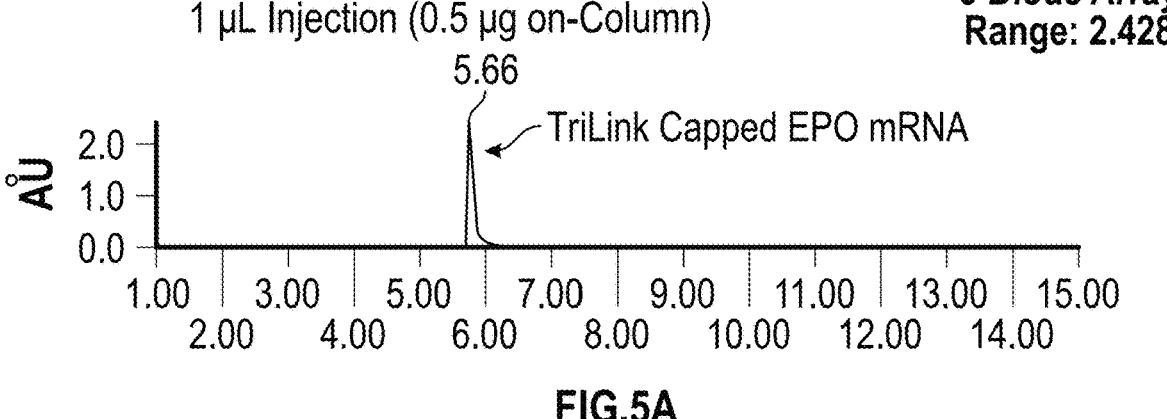
FIG. 5A displays a chromatogram of a 1 μL injection (0.5 μg on-column) of an intact TriLink capped EPO mRNA sample.
Figure 5B:
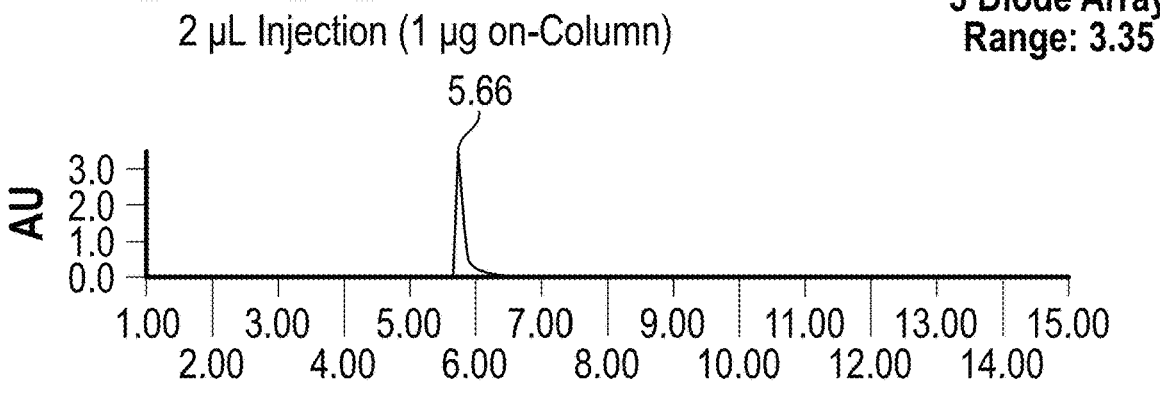
FIG. 5B displays a chromatogram of a 2 μL injection (1 μg on-column) of the intact TriLink capped EPO mRNA sample of FIG. 5A.
Figure 5C:
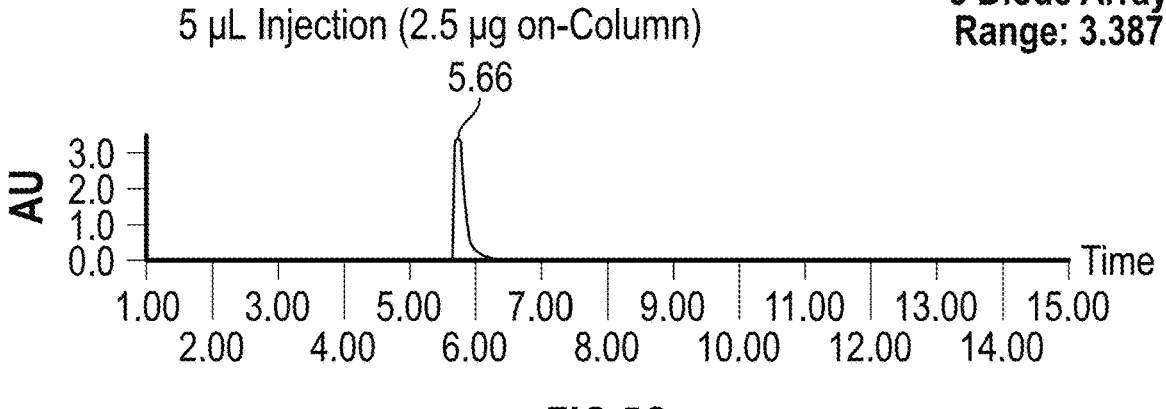
FIG. 5C displays a chromatogram of a 5 μL injection (2.5 μg on-column) of the intact TriLink capped EPO mRNA sample of FIG. 5A.
Figure 6:
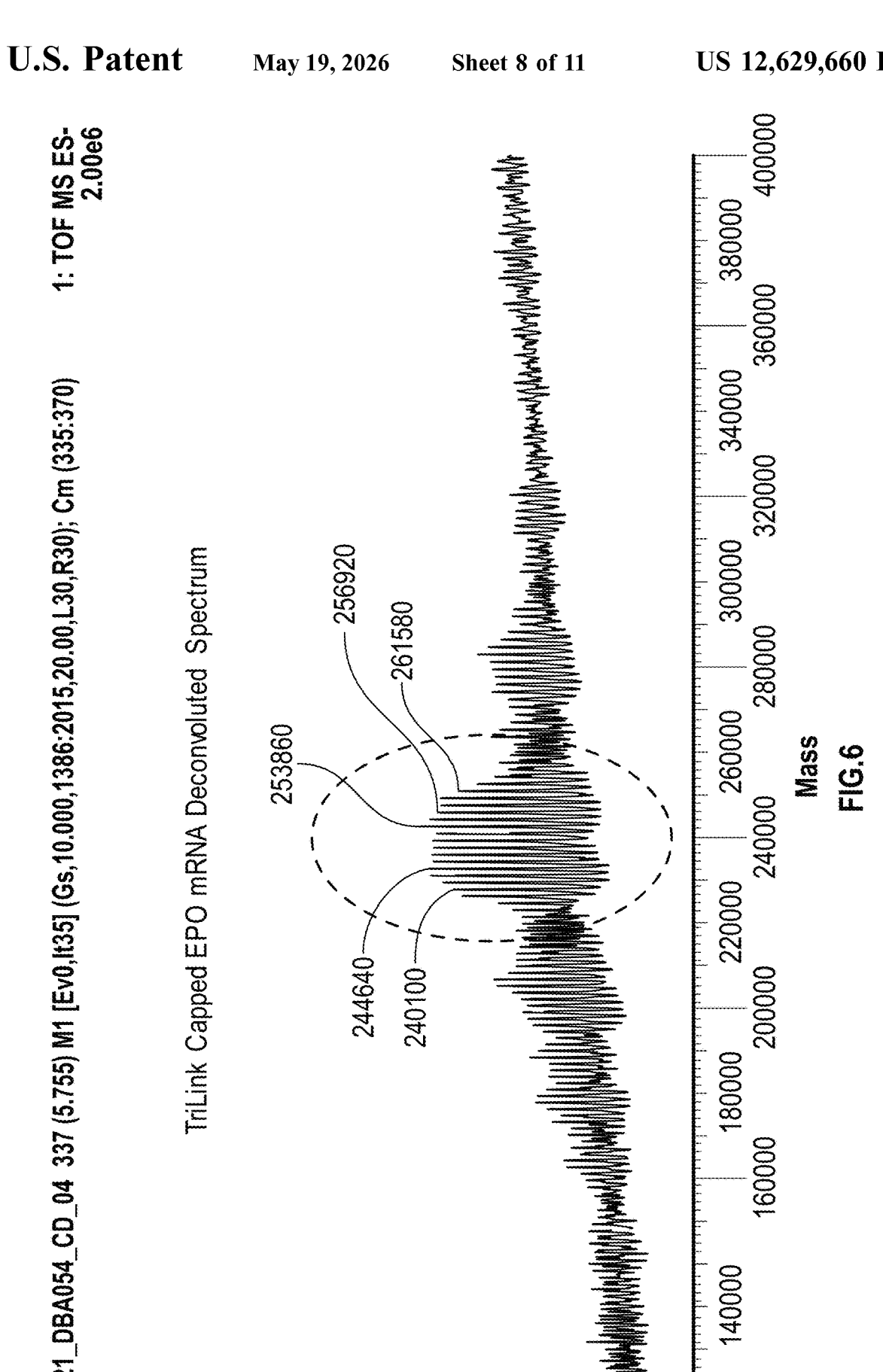
FIG. 6 displays a negative ion mode ESI-MS mass spectrum collected for EPO mRNA.

FIGS. 5A, 5B and 5C display chromatograms recorded with three different mRNA sample amounts loaded on-column. Analyses were performed using a Waters ACQUITY UPLC H-Class LC system outfitted with a TUV detector and a time-of-flight mass spectrometer. A negative ion mode ESI-MS mass spectrum collected for the EPO mRNA is displayed in FIG. 6. The collected m/z information deconvolutes to approximate the EPO mRNA to have a molecular mass of between 239 and 255 kDa.

Intact mRNA Separation Using an Average Pore Size Tailored to Exclude the Intact mRNA FIG. 7A, FIG. 7B, and FIG. 7C display chromatograms obtained for intact mRNA analysis of three different mRNA molecules (TriLink EPO (human erythropoientin) mRNA (858 nt); TriLink Luc (firefly luciferase) mRNA (1929 nt); and TriLink Cas-9 (CRISPR associated protein 9) mRNA (~4,521 nt)) following ion-pairing reverse phase separations. The arrow in each of FIG. 7A, FIG. 7B, and FIG. 7C indicates the elution of the major mRNA sample component, which is clearly distinct from other peaks which are unidentified mRNA impurities present in the sample. These results show the improved resolution capabilities of using a column with a porous sorbent, wherein the average pore diameter of the porous sorbent is selected such that the polynucleotides are substantially excluded from the sorbent pores.

The experimental conditions for the separation shown in FIGS. 7A, 7B, and 7C are as follows:

Column: C18 column, 130 Å average pore size (SKU: 186009484, available from Waters Corporation, Milford MA)

Column dimensions: 2.1×50 mm (for column 1 and column 2)

Column temperature: 60 degrees C.

Flow rate: 300 μL/min

Solvent A: 40 mM HFIP, 8 mM DIPEA (diisopropylethylamine) in DI water

Solvent B: 4 mM HFIP, 4 mM DIPEA in acetonitrile

Gradient Profile (10 minute gradient) having the following profile:

| Time (min) | Flow rate (mL/min) | Solvent A composition (%) | Solvent B composition (%) |
| --- | --- | --- | --- |
| 0.00 | 0.3 | 90 | 10 |
| 10.00 | 0.3 | 80 | 20 |
| 11.00 | 0.3 | 15 | 85 |
| 12.00 | 0.3 | 15 | 85 |
| 12.10 | 0.3 | 90 | 10 |
| 15.00 | 0.3 | 90 | 10 |

Injection volume: 2 μL

TUV: 260 nm

MS ionization: neg ESI-MS mode

Mass range: 400-5,000 Da

Cone Voltage: 40 V

Acquisition rate: 2 Hz

Intact mRNA and a DNA Plasmid Digest Separation with a 45 Å Pore Diameter Phase

An intact EPO-encoding mRNA bearing a poly A tail can be separated by ion pairing reversed phase using a 2.1×50 mm column packed with 1.7 μm 45 Å and 95 Å average pore diameter particles. These particles can be bonded with a trimethyl silane bonding or more hydrophobic surface chemistries, such as a C4, C8 or C18 bonding.

In conclusion, these results indicate that larger polynucleotides do not readily migrate through the intraparticle pore network, unlike small oligonucleotides (<100 mer, <5 kDa) and small molecules, and that in some situations this could be advantageous. More particularly, it was realized that this effect could be useful for the simultaneous analysis of large polynucleotides that are comprised in samples containing multiple types of components.

What is claimed is:

1. A method of separating and/or purifying polynucleotides, comprising:

injecting a sample comprising one or more polynucleotides into a chromatographic system, wherein the chromatographic system comprises a chromatographic column comprising a porous sorbent, wherein the average pore diameter of the porous sorbent is selected such that the polynucleotides are substantially excluded from the sorbent pores and has an average pore size of less than or equal to 300 Å; and flowing the sample through the chromatographic system under reversed phase chromatography conditions.

2. The method of claim 1, wherein the polynucleotide is RNA.

3. The method of claim 2, wherein the RNA is mRNA.

4. The method of claim 2, wherein the RNA is sgRNA.

5. The method of claim 1, wherein the polynucleotide has a length of at least 100 nucleotides.

6. The method of claim 1, wherein the average pore size of the porous sorbent is less than or equal to 130 Å.

7. The method of claim 6, wherein the average pore size of the porous sorbent is between about 30 Å to about 100 Å.

8. The method of claim 1, wherein the porous sorbent is a silica bonded with a $C_2$-$C_{18}$ hydrocarbon.

9. The method of claim 1, wherein the sample comprises a mixture of polynucleotides.

10. The method of claim 1, wherein the sample comprises a mixture of one or more synthetic polynucleotides and impurities associated with the synthesis of the one or more polynucleotides, and wherein the method further comprises separating the one or more polynucleotides from the impurities.

11. The method of claim 1, wherein the sample comprises a mixture of one or more polynucleotides and excipients associated with the formulation of the one or more polynucleotides in a pharmaceutical product, and wherein the method further comprises separating the one or more polynucleotides from the excipients.

12. The method of claim 1, wherein the one or more polynucleotides have a pore accessibility in the porous sorbent of less than about 10%.

13. The method of claim 1, wherein the chromatographic system further comprises a column heater, and wherein the method further comprises heating the chromatographic column to a temperature sufficient to denature double stranded polynucleotides in the sample.

14. The method of claim 1, wherein the reversed phase chromatography conditions comprise using a polar mobile phase comprising an ion pairing reagent.

15. The method of claim 1, wherein the porous sorbent is composed of particles having an average particle diameter of between about 1 μm to about 100 μm.

16. The method of claim 1, further comprising passing the one or more polynucleotides to a detector after the one or more polynucleotides pass through the chromatographic column.

17. The method of claim 16, wherein the detector is a mass spectrometer.

18. The method of claim 16, wherein the detector is an optical detector.

19. A method of separating and/or purifying polynucleotides, comprising:

injecting a sample comprising one or more polynucleotides into a chromatographic system, wherein the chromatographic system comprises a chromatographic column comprising a porous sorbent, wherein the average pore diameter of the porous sorbent is selected such that the polynucleotides are substantially excluded from the sorbent pores and wherein the one or more polynucleotides have a pore accessibility in the porous sorbent of less than about 10%; and flowing the sample through the chromatographic system under reversed phase chromatography conditions.

20. The method of claim 19, wherein the polynucleotide is RNA.

21. The method of claim 20, wherein the RNA is mRNA or sgRNA.

22. The method of claim 19, wherein the polynucleotide has a length of at least 100 nucleotides.

23. The method of claim 19, wherein the porous sorbent is a silica bonded with a $C_2$-$C_{18}$ hydrocarbon.

24. The method of claim 19, wherein the sample comprises a mixture of one or more synthetic polynucleotides and impurities associated with the synthesis of the one or more polynucleotides, and wherein the method further comprises separating the one or more polynucleotides from the impurities.

25. The method of claim 19, wherein the sample comprises a mixture of one or more polynucleotides and excipients associated with the formulation of the one or more polynucleotides in a pharmaceutical product, and wherein the method further comprises separating the one or more polynucleotides from the excipients.

26. A method of separating and/or purifying polynucleotides, comprising:

injecting a sample comprising one or more polynucleotides into a chromatographic system, wherein the chromatographic system comprises a chromatographic column comprising a porous sorbent, wherein the average pore diameter of the porous sorbent is selected such that the polynucleotides are substantially excluded from the sorbent pores;

heating the chromatographic column with a heater to a temperature sufficient to denature double stranded polynucleotides in the sample; and flowing the sample through the chromatographic system under reversed phase chromatography conditions.

27. The method of claim 26, wherein the porous sorbent is a silica bonded with a $C_2$-$C_{18}$ hydrocarbon.

28. The method of claim 26, wherein the reversed phase chromatography conditions comprise using a polar mobile phase comprising an ion pairing reagent.

29. The method of claim 26, wherein the porous sorbent is composed of particles having an average particle diameter of between about 1 μm to about 100 μm.

30. The method of claim 26, further comprising passing the one or more polynucleotides to a detector after the one or more polynucleotides pass through the chromatographic column.

* * * * *